A. MORIN.
OPERATING CAM SHAFT FOR VALVE DISTRIBUTION.
APPLICATION FILED FEB. 23, 1917.
1,248,434. Patented Nov. 27, 1917
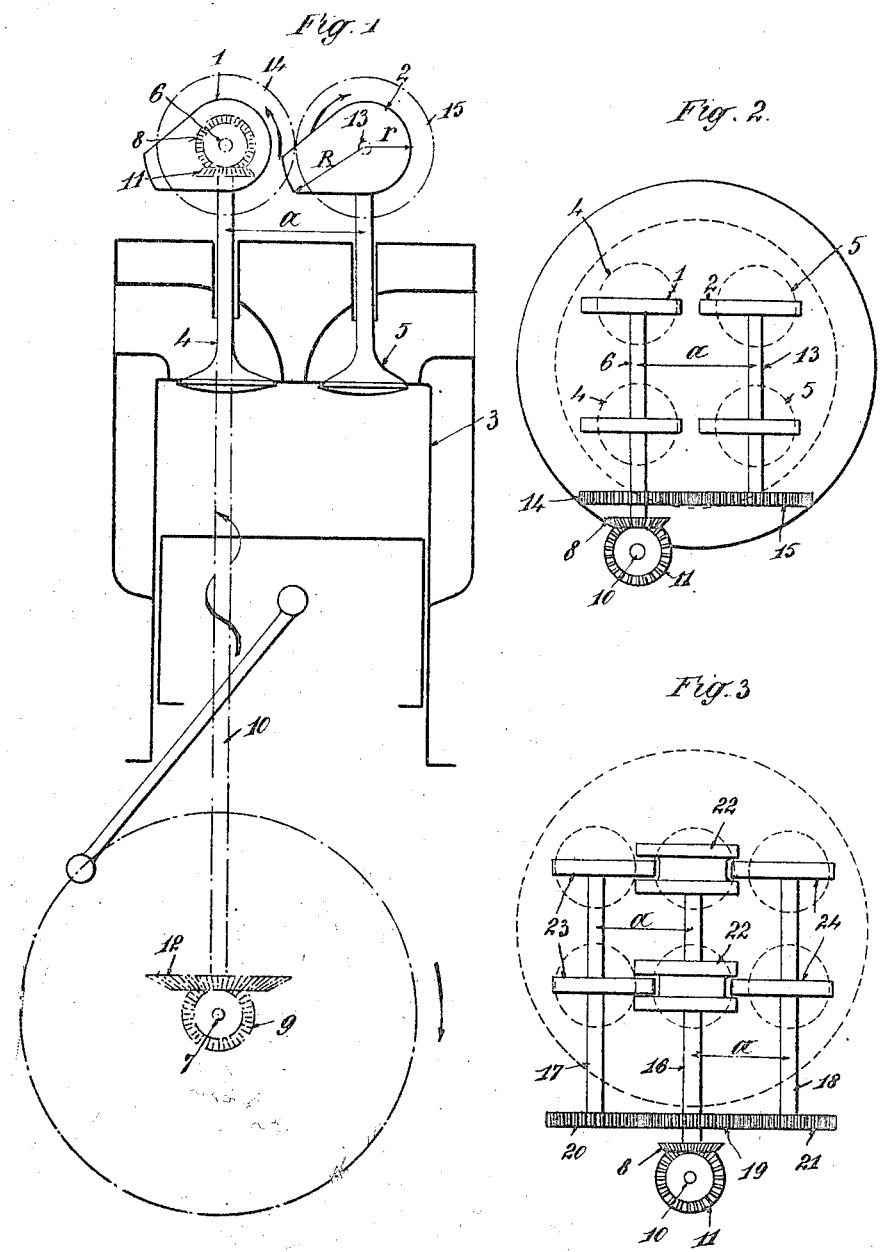

UNITED STATES PATENT OFFICE.

ALBERT MORIN, OF ASNIÈRES, FRANCE.

OPERATING CAM-SHAFT FOR VALVE DISTRIBUTION.

1,248,434.  Specification of Letters Patent.  Patented Nov. 27, 1917.

Application filed February 23, 1917. Serial No. 150,502.

*To all whom it may concern:*

Be it known that I, ALBERT MORIN, citizen of the Republic of France, residing at 81 Rue du Ménil, Asnières, Seine, in the Republic of France, have invented new and useful Improvements in Operating Cam-Shafts for Valve Distribution, of which the following is a specification.

The object of this invention is an improvement in the operation of cam shafts for valve distribution in motors and engines having 4 or 6 valves per cylinder operated by two or more parallel shafts, and this improvement consists in driving the neighboring cams in the opposite sense by profiting by the normal setting of the engine, so as to diminish the distance between the said cam shafts and thus to bring the valves nearer together, which allows of reducing the combustion chamber to a minimum.

The object of this invention is to provide a simplified transmission between the crank shaft and the cam shaft, consisting in the utilization of the special arrangement of the engine of the type having offset cylinders, and this allows of obtaining this transmission with the minimum amount of gearing.

In the accompanying drawing, there is represented diagrammatically and as an illustration of the system, a method of carrying out this invention in the case of an engine having 4 valves per cylinder and also for an engine having 6 valves per cylinder.

Figure 1 is a side elevation, with a portion in sectional view, of a 4 valve engine according to this invention, showing the cylinder offset from the crank shaft. Fig. 2 is a plan view of the engine represented in Fig. 1. Fig. 3 is a partial plan view of an engine having 6 valves per cylinder according to the present invention.

In the usual engines, the periods of opening and closing of the valves are relatively close to the dead points. Besides, in the usual case, the cam shafts rotate in the same direction. Being given these conditions, and considering the normal angular displacement of the cams (or 270° between the cams) in the position which the cams occupy at the instant when the inlet cam is about to act upon the end of the valve rod and when the exhaust cam is about to complete its stroke, it is evident that in order that the cams shall rotate without coming in contact it is required that the distances between the axes of their driving shafts shall be at least equal to the sum of the longest radii of the cams, adding a certain play. This distance, therefore determines the position of the valves. Such distance can be reduced to a minimum by adopting the disposition which is embodied in the present invention, and which consists in setting the inlet and exhaust cams at the same angle on their respective driving shafts at the moment the exhaust valve has just closed and the intake is just about to be opened, and of rotating these shafts in the opposite direction.

Referring to Figs. 1 and 2, in which the inlet cams 1 and exhaust cams 2 are indicated in the position of setting which is indicated above, it is observed that in order to prevent the cams from touching, it is necessary and it also suffices that the distance $a$ between the cam shafts shall be equal to the sum $R+r$ increased by a certain play, in which $R$ designates the longest radius of the projecting part of the cams and $r$ the radius of the cylindrical part. In this way it is possible to mount at the extremity of the cylinder itself, two inlet valves 4 and two exhaust valves 5, these being brought sufficiently near together in order that the combustion chamber need not have a larger section than that of the cylinder in order to receive these valves.

On the other hand, it is possible to take advantage of what is termed the offset type of engine, in order to mount a cam shaft 6 in the vertical plane passing through the crank shaft 7 and to drive this cam shaft by mounting a pinion 8 upon the cam shaft 6 and a bevel gear 9 on the crank shaft, and the driving is obtained by the use of an intermediate shaft 10 having on its extremities the bevel-gears 11 and 12. It is understood that the pinion 12 has a radius which is twice the radius of pinion 9 in order to give the cam shaft half the speed of the engine. The cam shaft 6 drives the cam shaft 13 by means of the gear 14 which engages with the gear 15.

In Fig. 3 is represented a plan view of a cylinder having six valves provided with the driving device designed according to the present invention. The middle cam shaft 16 is driven in the manner which has just been described; this shaft drives the two cam shafts 17 and 18 situated on either side, by means of the straight gears 19, 20 and 21, in such manner that two neighboring cam shafts always rotate in the opposite direction.

It will be also noted that the cams such as 22 mounted on the shaft 16 possess grooves so designed as to give passage to the cams such as 23 and 24, these being mounted respectively upon shafts 17 and 18, and this disposition reduces the distance between the cam shafts to a minimum for the purpose designated.

Having now described my invention, what I claim as new and desire to secure by Letters Patent is:

1. A distribution system for motors or engines consisting in the combination of a cylinder, inlet and exhaust valves mounted at the end of said cylinder, and parallel cam shafts placed above and arranged to operate the different sets of valves, and disposed so that the two neighboring cam shafts have their cams set at the same angle on their respective shafts at the moment the exhaust valve has just closed and the intake valve is about to be opened, and shall rotate in opposite directions, substantially as described and for the purpose set forth.

2. A distribution system for motors or engines consisting in the combination of a cylinder, two inlet valves and two exhaust valves mounted at the ends of said cylinder; two parallel cam shafts rotating in opposite directions having their cams set at the same angle on their respective shafts at the moment the exhaust valve has just closed and the intake valve is about to be opened, and mounted above the valve rods in such manner that these cams drive directly the inlet valve and the exhaust valve respectively, substantially as described and for the purpose set forth.

3. A distribution system for an engine of the offset type, consisting in the combination of a cylinder, two inlet and two exhaust valves mounted at the end of said cylinder in such manner that the plane of the inlet valve-rods passes through the trunnions of the crank-shaft of the engine, two parallel cam shafts having their cams set at the same angle on their respective shafts at the moment the exhaust valve has just closed and the intake valve is about to be opened, and which drive directly the inlet valves and the exhaust valves respectively, two pinions mounted each upon one of the said cam shafts, and in gear with each other; a pinion mounted on the crank shaft; an intermediary driving shaft disposed in the plane of the inlet valve rods, a pinion mounted on this intermediary shaft and engaging with the pinion mounted on the engine crank shaft; a second pinion mounted on the end of the intermediary shaft and a second pinion mounted on the inlet valve cam shaft and engaging with the second pinion mounted on the intermediary shaft, substantially as described and for the purpose set forth.

In testimony whereof I have signed my name to this specification in the presence of two subscribing witnesses.

ALBERT MORIN.

Witnesses:
LOUIS MOSES,
CHAS. P. PRESSLY.